(12) United States Patent
Macht et al.

(10) Patent No.: US 7,287,376 B2
(45) Date of Patent: Oct. 30, 2007

(54) HYDRAULIC CYLINDER, IN PARTICULAR SLAVE CYLINDER FOR A HYDRAULIC CLUTCH ACTUATION SYSTEM FOR MOTOR VEHICLES

(75) Inventors: Egid Macht, München (DE); Hubert Derra, Neubrunn (DE); Jürgen Ryba, Reckendorf (DE); Dieter Grimmer, Eltmann (DE)

(73) Assignee: FTE automotive GmbH, Ebern (DE)

( * ) Notice: Subject to any disclaimer, the term of this patent is extended or adjusted under 35 U.S.C. 154(b) by 116 days.

(21) Appl. No.: 11/291,345

(22) Filed: Dec. 1, 2005

(65) Prior Publication Data

US 2006/0120907 A1    Jun. 8, 2006

(30) Foreign Application Priority Data

Dec. 3, 2004    (DE)    ............ 10 2004 058 609

(51) Int. Cl.
*F15B 7/00*    (2006.01)
*F15B 15/26*    (2006.01)

(52) U.S. Cl. .............. 60/570; 60/533; 92/23; 92/130 C; 92/171.1

(58) Field of Classification Search .......... 60/533, 60/568, 570; 92/15, 23, 30, 130 C, 171.1
See application file for complete search history.

(56) References Cited

U.S. PATENT DOCUMENTS

| 1,441,846 | A | * | 1/1923 | Gilman | 92/15 |
| 2,786,450 | A | * | 3/1957 | Jacobus et al. | 92/30 |
| 4,665,802 | A | | 5/1987 | Barker et al. | |
| 4,766,804 | A | | 8/1988 | Barker | |
| 4,920,609 | A | * | 5/1990 | Lin | 92/15 |
| 5,540,138 | A | * | 7/1996 | Robbins, Jr. | 92/23 |
| 5,735,188 | A | | 4/1998 | Nix et al. | |
| 5,836,235 | A | | 11/1998 | Rudiger et al. | |
| 6,668,997 | B2 | | 12/2003 | Sander et al. | |
| 2005/0051407 | A1 | | 3/2005 | Derra et al. | |

FOREIGN PATENT DOCUMENTS

| DE | 43 22 969 A1 | 1/1995 |
| DE | 195 16 392 A1 | 11/1996 |
| GB | 2 241 298 A | 8/1991 |

* cited by examiner

*Primary Examiner*—Michael Leslie
(74) *Attorney, Agent, or Firm*—Reising, Ethington, Barnes, Kisselle, P.C.

(57) ABSTRACT

A hydraulic cylinder comprises a piston assembly with a piston and a piston rod, a cylinder housing with a housing bottom, a pressure chamber in the cylinder housing delimited by the piston and housing bottom, a spring element which prestresses the piston assembly away from the housing bottom, and a fixing element which fixes the piston assembly in a predefined stroke position relative to the cylinder housing prior to first actuation of the hydraulic cylinder and is designed to release the piston assembly relative to the cylinder housing upon first actuation of the hydraulic cylinder. The spring element is arranged on the side of the piston which is remote from the pressure chamber, whereas the fixing element is provided in the pressure chamber at the housing bottom and co-operates with a mating element on the piston to releasably fix the piston assembly relative to the cylinder housing.

17 Claims, 3 Drawing Sheets

HYDRAULIC CYLINDER, IN PARTICULAR SLAVE CYLINDER FOR A HYDRAULIC CLUTCH ACTUATION SYSTEM FOR MOTOR VEHICLES

FIELD OF THE INVENTION

The invention relates to a hydraulic cylinder and, in particular, to a slave cylinder for a hydraulic clutch actuation system for motor vehicles, as commonly used in the automotive industry.

DESCRIPTION OF THE PRIOR ART

A conventional hydraulic clutch actuation system for motor vehicles has a master cylinder which is connected to a compensating reservoir filled with hydraulic fluid. The master cylinder has a cylinder housing, in the housing bore of which a piston is accommodated in a longitudinally displaceable manner. The master cylinder piston delimits a pressure chamber in the housing bore of the cylinder housing and can be mechanically subjected to an actuating force by means of a clutch pedal or an electromotor drive. The pressure chamber of the master cylinder is hydraulically connected via a pressure line to a pressure chamber of a slave cylinder, so that the pressure generated in the pressure chamber of the master cylinder by pushing down on the clutch pedal or by electromotive displacement of the master cylinder piston can be transferred via the fluid column in the pressure line to the pressure chamber of the slave cylinder. The slave cylinder likewise has a cylinder housing with a housing bore in which a piston is accommodated in a longitudinally displaceable manner, said piston delimiting the pressure chamber of the slave cylinder and thus being able to be acted upon by the pressure generated in the master cylinder. Assigned to the slave cylinder piston is a piston rod which acts on a clutch lever which in turn is effectively connected to the release bearing of the clutch. As a result, the release bearing of the clutch can be acted upon by an actuating force via the slave cylinder piston so as, via a release mechanism, to separate the clutch pressure plate from the clutch driving disc and thus the engine from the gear mechanism of the motor vehicle.

Particularly in connection with hydraulic clutch actuation systems which are supplied to the production line of the motor vehicle manufacturer as a preassembled unit which consists of master cylinder, compensating reservoir, pressure line and slave cylinder and which is prefilled with hydraulic fluid, measures have already been proposed in the prior art (e.g. U.S. Pat. Nos. 4,665,802, 4,766,804, GB 2 241 298 A) for temporarily holding the piston rod of the slave cylinder in a predefined stroke position relative to the cylinder housing of the slave cylinder so as to prevent overfilling of the hydraulic clutch actuation system, for transporting the same and for simplifying mounting of the unit in the motor vehicle.

For instance, GB 2 241 298 A discloses a slave cylinder for a hydraulic clutch actuation system for motor vehicles, comprising a piston assembly which has a piston and a piston rod, and a cylinder housing which has a housing bottom and in which a pressure chamber is provided, which pressure chamber on one side is delimited in a variable manner by the piston and on the other side is delimited in a fixed manner by the housing bottom. The slave cylinder furthermore has a spring element which prestresses the piston assembly in a direction away from the housing bottom, for which purpose the spring element is designed as a helical compression spring and is arranged between the piston and the housing bottom in the pressure chamber. Finally, the slave cylinder has a fixing element which fixes the piston assembly in a predefined stroke position, that is to say axial position, relative to the cylinder housing prior to first actuation of the slave cylinder and is designed to release the piston assembly relative to the cylinder housing upon first actuation of the slave cylinder.

In this prior art, the fixing element has an annular flange section which is inserted in a stepped end section of the housing bore of the cylinder housing at the open end thereof and is fixed there by means of a securing ring. From the annular flange section of the fixing element, a number of thin fixing strips extend radially inwards towards the end of the piston rod which is remote from the piston, where they merge integrally into a piston rod head in order to hold the piston rod and thus the entire piston assembly in the predefined stroke position relative to the cylinder housing prior to first actuation of the slave cylinder. When the slave cylinder is actuated for the first time, the fixing strips on the annular flange section tear and release the piston rod, as a result of which the piston assembly which is acted upon hydraulically via the pressure chamber can move by means of the force of the helical compression spring in a direction which increases the size of the pressure chamber.

Even though, compared to earlier solutions (e.g. U.S. Pat. Nos. 4,665,802, 4,766,804) in which the fixing element had a separate retaining cap which was placed on the piston rod head and was releasably prestressed by means of fixing strips relative to the outer circumference of the cylinder housing in order to keep the piston rod in a predefined stroke position relative to the cylinder housing, this prior art has the advantage that the construction of the slave cylinder is considerably simplified on account of the one-piece design of fixing element and piston rod, the prior art can nevertheless still be further improved in particular in terms of its function. For example, in the prior art it is not possible to attach to the head of the piston rod that is remote from the piston a sliding cap or dust protection cap which can optionally be pivoted relative to the piston rod, as is known for example from the prior art according to DE 195 16 392 A1 or DE 100 38 012 A1. Moreover, during operation of the slave cylinder, problems may arise from the fact that the fixing strips which are integrally formed on the piston rod head and which have torn away from the annular flange section of the fixing element impair the function of the slave cylinder since they impede for example a possibly necessary, stroke-dependent angular movement of the piston rod relative to the central axis of the cylinder housing.

SUMMARY OF THE INVENTION

With respect to the prior art outlined above, the object of the invention is to provide a hydraulic cylinder, in particular a slave cylinder for a hydraulic clutch actuation system for motor vehicles, which is compact and is designed in as simple a manner as possible, in which the piston assembly is held in a predefined stroke position relative to the cylinder housing prior to first actuation of the hydraulic cylinder and is released upon first actuation of the hydraulic cylinder, without it being possible for the fixing element provided for this purpose to cause problems during operation of the hydraulic cylinder.

According to the invention, in a hydraulic cylinder, in particular a slave cylinder for a hydraulic clutch actuation system for motor vehicles, comprising a piston assembly which has a piston and a piston rod, a cylinder housing which has a housing bottom, a pressure chamber in the cylinder housing, which on one side is delimited in a variable manner by the piston and on the other side is delimited in a fixed manner by the housing bottom, a spring element which prestresses the piston assembly in a direction away from the housing bottom, and a fixing element which fixes the piston assembly in a predefined stroke position relative to the cylinder housing prior to first actuation of the hydraulic cylinder and is designed to release the piston assembly relative to the cylinder housing upon first actuation of the hydraulic cylinder, the spring element is arranged on the side of the piston which is remote from the pressure chamber, whereas the fixing element is provided in the pressure chamber at the housing bottom and co-operates with a mating element on the piston to releasably fix the piston assembly relative to the cylinder housing.

By moving the spring element out of the pressure chamber to the side of the piston which is remote from the pressure chamber, it is firstly possible to shorten the axial length of the cylinder housing. This furthermore creates space to arrange the fixing element at the housing bottom of the cylinder housing. On account of the fact that the piston is temporarily held relative to the cylinder housing by means of the fixing element, it is possible inter alia to mount the hydraulic cylinder according to the invention at its place of installation substantially without any force, since in the process the spring element need not be compressed by pushing the piston rod into the cylinder housing but rather the piston and thus also the piston rod can be temporarily held relative to the cylinder housing by means of the fixing element, in a defined stroke position which is favourable for mounting purposes, counter to the force of the spring element. Other useful purposes of the invention include avoiding overfilling of a hydraulic system comprising the hydraulic cylinder according to the invention, during prefilling thereof, wherein the fixing element ensures that the hydraulic cylinder can accommodate only a predefined quantity of hydraulic fluid prior to its first actuation, and securing the hydraulic cylinder according to the invention against damage caused during transportation, wherein the fixing element prevents the piston rod from protruding excessively out of the cylinder housing during transportation of the hydraulic cylinder.

On account of the fact that the fixing element is located in the pressure chamber at the housing bottom of the cylinder housing, the end of the piston rod which is remote from the piston remains free in any case, so that here, depending on the respective requirements, a sliding cap, dust protection cap or the like can be fitted without any problem during or prior to mounting of the hydraulic cylinder at the place of installation. Moreover, the fixing element is thus seated at a location at which it cannot prevent for example an angular movement of the piston rod relative to the central axis of the cylinder housing and/or cannot cause undesirable friction noises. Further effects and advantages of the invention emerge from the detailed description of one preferred example of embodiment.

BRIEF DESCRIPTION OF THE DRAWINGS

Hereinbelow, the invention will be explained in more detail on the basis of a preferred example of embodiment and with reference to the appended, partially schematic drawings, in which elastomeric parts are shown in the non-deformed state for the sake of simplifying the drawing. In the drawings.

DETAILED DESCRIPTION OF AN EXAMPLE OF EMBODIMENT

Figure 1:
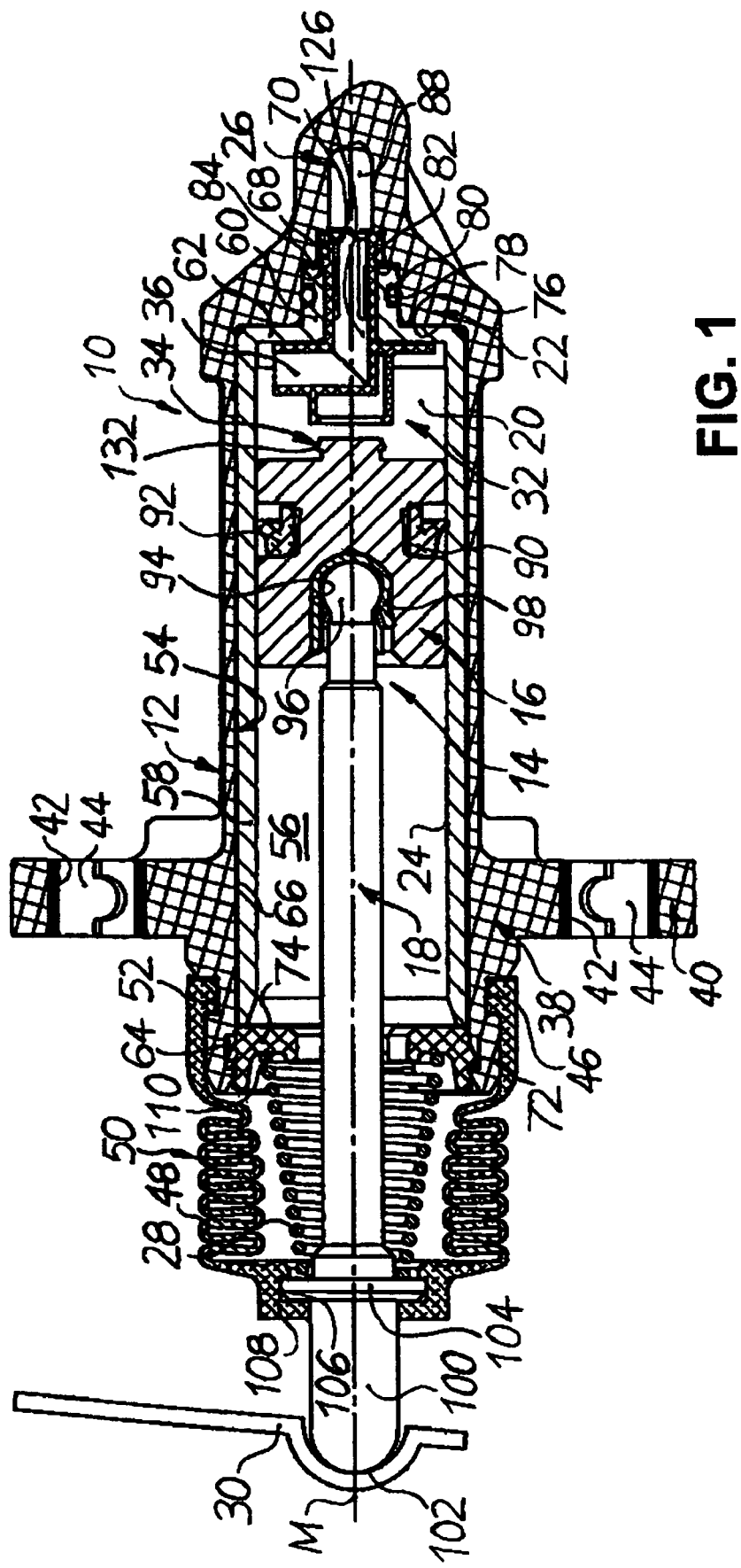
FIG. 1 shows a longitudinal sectional view of a slave cylinder designed according to the invention for a hydraulic clutch actuation system for motor vehicles, comprising a piston assembly accommodated in a cylinder housing lined with a sleeve, wherein the slave cylinder is shown in its non-actuated basic or rest position following first actuation of the slave cylinder, in which position a piston rod of the piston assembly acts on a clutch lever with its end projecting from the cylinder housing, in such a way as to bring about actuation, whereas a piston of the piston assembly is at a defined distance from an insertion part provided at the bottom of the cylinder housing.

FIG. 1 shows a slave cylinder 10 for a hydraulic clutch actuation system for motor vehicles, by way of example of a hydraulic cylinder designed according to the invention. The slave cylinder 10 has a cylinder housing, referenced 12 as a whole, in which a piston assembly 14 is accommodated in a longitudinally displaceable manner, the piston assembly comprising a piston 16 and a piston rod 18 which is connected to the piston 16 at least in a manner resistant to tension and pressure. In the cylinder housing 12 there is a pressure chamber 20 which on the left-hand side in FIG. 1 is delimited in a variable manner by the piston 16, on the right-hand side in FIG. 1 is delimited in a fixed manner by a housing bottom 22 of the cylinder housing 12, and in the radially outward direction is delimited in a fixed manner by a circumferential wall of the cylinder housing 12. In order to displace the piston 16 in the cylinder housing 12, the pressure chamber 20 can optionally be acted upon by a pressure means, for example brake fluid, via a pressure connection 26 provided at the housing bottom 22, which pressure connection, in the mounted state of the slave cylinder 10, is connected in a manner known per se, via a pressure line (not shown), to a clutch master cylinder (likewise not shown). Furthermore, a spring element in the form of a helical compression spring 28 is provided on the side of the piston 16 which is remote from the pressure chamber 20, said spring element being supported at its right-hand end in FIG. 1 against the cylinder housing 12 and acting with its left-hand end in FIG. 1 on the piston rod 18, so that the helical compression spring 28 prestresses the piston assembly 14 in a direction away from the housing bottom 22, so as, in the mounted state of the slave cylinder 10, to keep the piston rod 18 bearing against a clutch lever 30 which is shown schematically in FIG. 1. As will be described in more detail below, an insertion part 32 is provided in the pressure chamber 20 at the housing bottom 22, more specifically is inserted in the pressure connection 26 in the housing bottom 22, and this advantageously fulfills a number of functions in the illustrated example of embodiment. Firstly, the insertion part 32 serves as a fixing element which fixes the piston assembly 14 in a predefined stroke position relative to the cylinder housing 12 prior to first actuation of the slave cylinder 10 and is designed to release the piston assembly 14 relative to the cylinder housing 12 upon first actuation of the slave cylinder 10, wherein the insertion part 32 co-operates with a mating element on the piston 16, in this case in the form of an extension 34, to releasably fix the piston assembly 14 relative to the cylinder housing 12. Secondly, the insertion part 32 serves as a type of deaerator for the pressure chamber 20, for which purpose it has a channel section 36 which communicates with the pressure connection 26 and, in the installed position of the slave cylinder 10 as shown in FIG. 1, extends essentially in the vertical direction and opens into the pressure chamber 20 in the vicinity of the circumferential wall 24 of the cylinder housing 12.

Figure 2:
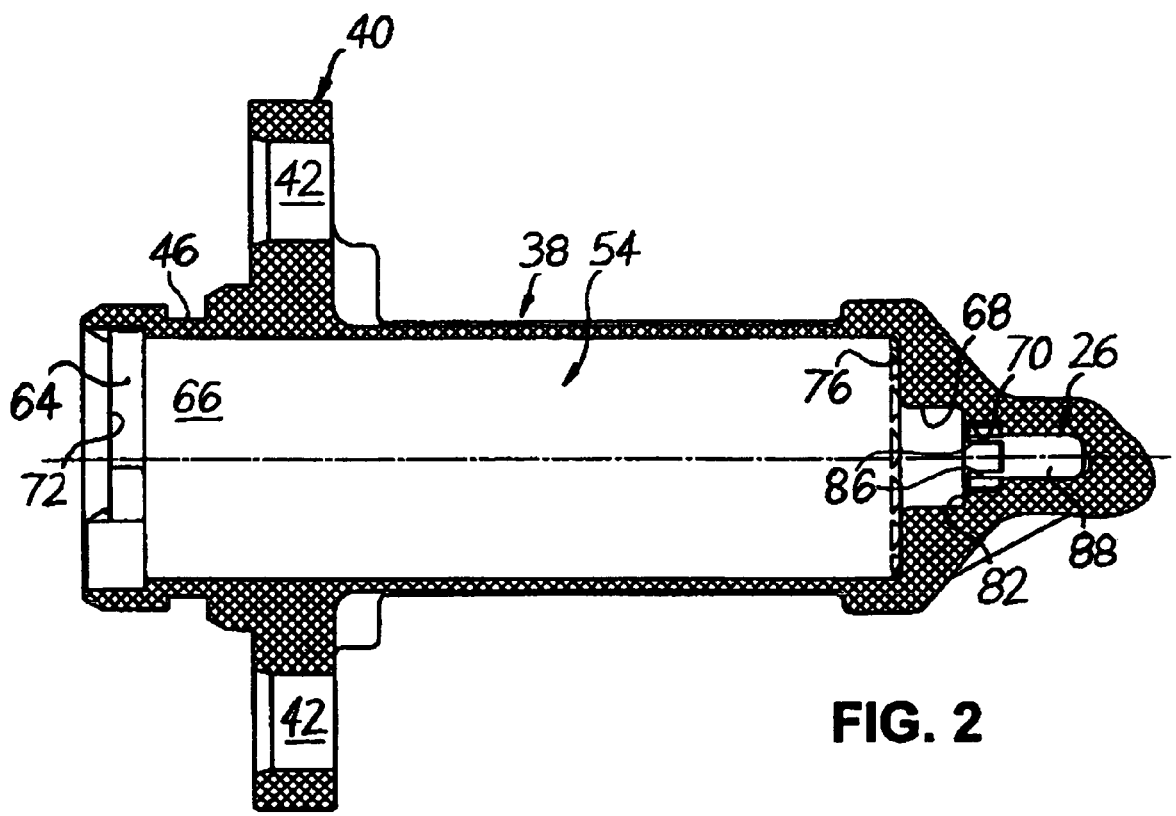
FIG. 2 shows a longitudinal sectional view of a basic body of the cylinder housing of the slave cylinder shown in FIG. 1, without add-on parts, in particular without the sleeve which lines the cylinder housing.

As shown in FIG. 1, the cylinder housing 12 has a basic body 38 which is preferably injection-molded from plastic, said basic body being shown separately in FIG. 2. On its outer circumference, the basic body 38 is provided with a fixing flange 40 for mounting the slave cylinder 10 in the motor vehicle, the fixing flange having two fixing bores 42 which are reinforced by slotted steel bushings 44 as shown in FIG. 1. In the mounted state of the slave cylinder 10, screws (not shown) for example extend through the fixing bores 42 lined with the steel bushings 44, said screws serving to fix the slave cylinder 10 to for example a wall of the gear mechanism (not shown) in the motor vehicle. To the left of the fixing flange 40 in FIGS. 1 and 2, the basic body 38 of the cylinder housing 12 furthermore has a radial groove 46 on its outer circumference, in which radial groove an elastomeric protective cap 50 with an annular collar 52 on its inner circumference is inserted as shown in FIG. 1, the protective cap having a concertina-like section 48 which surrounds the piston rod 18.

On its inner circumference, the basic body 38 of the cylinder housing 12 has a stepped bore 54 which is open towards the left in FIG. 2 and in which a preferably metallic sleeve 56 is inserted as a further component of the cylinder housing 12, as shown in FIG. 1. The sleeve 56 has two hollow-cylindrical sleeve sections 58, 60 of different diameter which are joined to one another at the bottom 22 of the cylinder housing 12 via an annular section 62. Starting from the left-hand side in FIG. 2, the bore 54 of the basic body 38 has four sections 64, 66, 68 and 70 of different diameter, said diameter becoming smaller from left to right in FIGS. 1 and 2.

Figure 3:
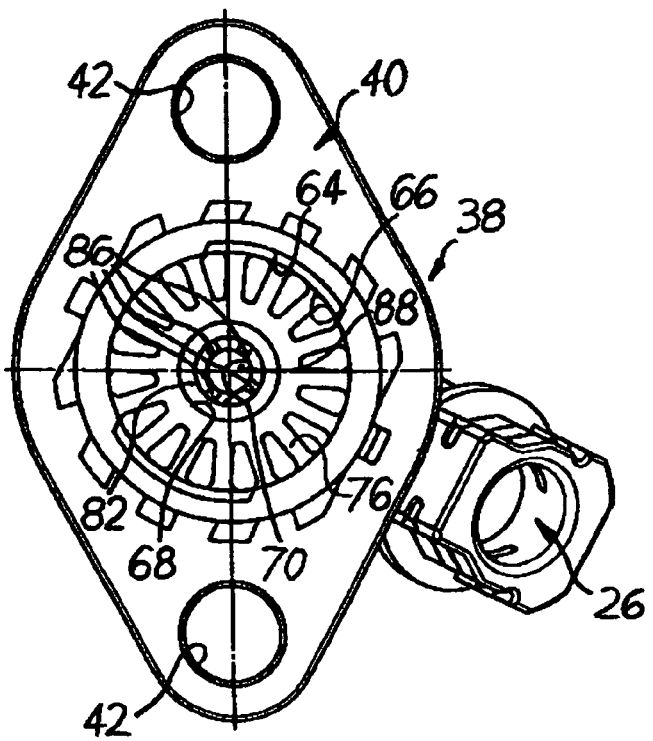
FIG. 3 shows a front view of the basic body of the cylinder housing of FIG. 2, seen from the left in FIG. 2.
Figure 4:
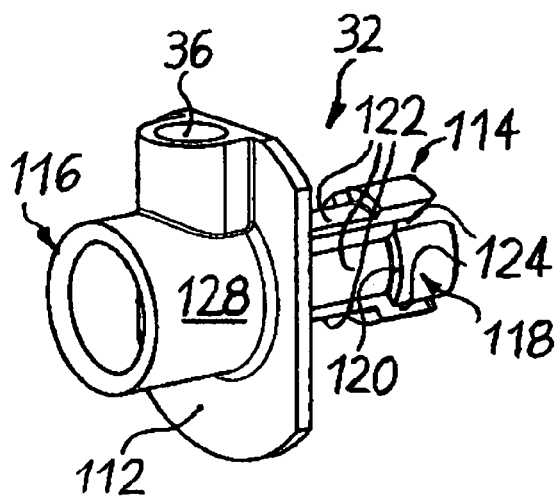
FIG. 4 shows a perspective diagram, in an oblique view from the front, of the insertion part provided at the bottom of the cylinder housing in the slave cylinder shown in FIG. 1.

The first bore section 64 has an undercut 72 at its open end, said undercut serving to fix to the cylinder housing 12 an annular securing element 74 which is slotted for mounting purposes and is preferably made of plastic, which securing element bears against the left-hand end face of the sleeve 56 in FIG. 1 and thus secures the sleeve 56 in the basic body 38 of the cylinder housing 12. Received tightly in the second bore section 66 of the stepped bore 54 of the basic body 38 is the larger-diameter sleeve section 58 of the sleeve 56, which with its inner circumferential face forms the circumferential wall 24 that delimits the pressure chamber 20. The second bore section 66 is adjoined by the third bore section 68 via an annular shoulder 76, against which the annular section 62 of the sleeve 56 bears. Received tightly in the third bore section 68 of the stepped bore 54 in the basic body 38 is the smaller-diameter sleeve section 60 of the sleeve 56. Here, the sleeve section 60 is provided on its outer circumference with a radial groove 78 for receiving an O-ring 80 which ensures a static seal between the third bore section 68 and the sleeve section 60. The third bore section 68 is adjoined by the fourth bore section 70 via a further annular shoulder 82, wherein the dimensions of the smaller-diameter sleeve section 60 of the sleeve 56 on the one hand and of the third and fourth bore sections 68, 70 of the stepped bore 54 on the other hand are adapted to one another in such a way that an annular end face 84 of the sleeve section 60 has a small axial distance from the annular shoulder 82 and protrudes radially inwards beyond the latter in order to fix the insertion part 32 in the pressure connection 26 in a manner to be described in more detail below. As can furthermore be seen from FIGS. 2 and 3, the fourth bore section 70 of the stepped bore 54 in the basic body 38 is provided on its inner circumference with a plurality of (in the illustrated example of embodiment four) longitudinal ribs 86 which extend in the axial direction of the cylinder housing 12, project radially inwards, are distributed non-uniformly and asymmetrically over the circumference of the fourth bore section 70 and serve for orientation of the angle of rotation of the insertion part 32 in the pressure connection 26, as will likewise be described in more detail below. Finally, a smaller-diameter pressure connection bore 88 which is formed in the basic body 38 opens into the fourth bore section 70 at the right-hand end of the fourth bore section 70 in FIGS. 1 and 2.

Although, in the illustrated example of embodiment, the fourth bore section 70 of the stepped bore 54 has a smaller diameter than the third bore section 68, so that the basic body 38 of the cylinder housing 12 in this region essentially has no excessively large differences in wall thickness with regard to the outer contour of the basic body 38, in the case of a different outer contour of the basic body 38 the fourth bore section 70 could also in principle be formed with a diameter which corresponds to the diameter of the third bore section 68.

It can be seen from the above description that the pressure connection bore 88, the fourth bore section 70 of the stepped bore 54 and the sleeve section 60 of the sleeve 56 which is accommodated in the third bore section 68 form part of the pressure connection 26, via which the pressure chamber 20 can be acted upon by the pressure medium. As a result of the static seal brought about by the O-ring 80 at the outer circumference of the smaller-diameter sleeve section 60 of the sleeve 56, the latter is subjected to a resulting force to the right in FIG. 1 when the pressure chamber 20 is acted upon by pressure via the pressure connection 26, in which case the hydraulic pressure acts on the one hand on the annular end face 84 of the sleeve section 60 and on the other hand on the end face of the annular section 62 of the sleeve 56 which faces the pressure chamber 20 and has a greater surface area than the aforementioned end face 84, and this resulting force endeavours to keep the sleeve 56 in the stepped bore 54 of the basic body 38 and thus reduces the pressure on the fixing of the sleeve 56 in the basic body 38 by means of the securing element 74.

As can furthermore be seen from FIG. 1, the piston 16, which is guided with a small amount of radial play in the larger-diameter sleeve section 58 of the sleeve 56 of the cylinder housing 12 and in the illustrated example of embodiment is made of metal, has on its outer circumference a radial groove 90 for receiving a grooved ring 92. In a manner known per se, the elastomeric grooved ring 92 bears with the sealing lip on its outer circumference, under a certain prestress, against the circumferential wall 24 of the cylinder housing 12, and thus ensures dynamic sealing of the pressure chamber 20 towards the left in FIG. 1.

On the left-hand side in FIG. 1, the piston 16 is furthermore provided with a central cutout 94 in which there is held in an articulated manner, by means of a securing element 98, a spherical head 96 which is formed at the right-hand end of the piston rod 18 in FIG. 1, so that the piston rod 18 has a certain degree of angular mobility relative to the piston 16. Instead of the configuration of the piston assembly 14 which is shown in FIG. 1, said piston assembly could also be made in one piece, with a piston outer face which slopes downward in a conical or cambered manner toward the piston rod so as to ensure angular mobility, as is known in principle from DE 43 22 969 A1 or DE 43 31 241 A1.

The piston rod 18, which in the illustrated example of embodiment is made of metal, has, on the left-hand side in FIG. 1, a thickened end 100 with a substantially spherical end face 102, via which the piston rod 18 acts on the clutch lever 30 in a manner effective for actuation. At the start of the thickened end 100, the piston rod 18 furthermore has an annular collar 104 which on the one hand serves to connect the protective cap 50 to the piston rod 18, wherein the annular collar 104 of the piston rod 18 engages in a form-fitting manner in an essentially complimentarily shaped annular cutout 106 in a fixing section 108 of the protective cap 50, which fixing section 108 adjoins the concertina-like section 48 of the protective cap 50 on the side of the protective cap 50 which is remote from the pressure chamber 20. On the other hand, the annular collar 104 of the piston rod 18 forms, with its end face which faces the pressure chamber 20, an abutment for the helical compression spring 28, wherein a certain radial centering action for the piston rod 18 also comes from the end of the helical compression spring which faces the annular collar 104, and this centering action is advantageous when mounting the slave cylinder 10 in the motor vehicle.

It can furthermore be seen from FIG. 1 that, in order to keep the sleeve 56 in the cylinder housing 12, the securing element 74 is provided with an axial groove 110 on its side remote from the pressure chamber 20, which axial groove serves as a further abutment and for centering the right-hand end of the helical compression spring 28 in FIG. 1 which faces towards the pressure chamber 20, said helical compression spring expanding in a conical manner in terms of its diameter from the annular collar 104 towards the axial groove 110, that is to say being designed in the shape of a truncated cone. On account of the helical compression spring 28 being moved out of the pressure chamber 20 and the sleeve 56 into the illustrated position between the securing element 74 and the annular collar 104 on the piston rod 18, it is advantageously possible, compared to the prior art outlined above, for the ratio of stroke to clearance volume (or actual volume in the illustrated basic position of the piston 16) of the pressure chamber 20 to be reduced, and this ultimately makes it possible to shorten the axial length of the cylinder housing 12. Moreover, again compared to the prior art discussed in the introduction, the pressure chamber 20 can be better rinsed through or emptied of pressure medium when the piston 16 returns from an actuated position to its basic position, and this helps to better deaerate the slave cylinder 10. In this case, there is also no need for the previously known piston return spring in the pressure chamber as a crystallization site for air bubbles.

Figure 7:
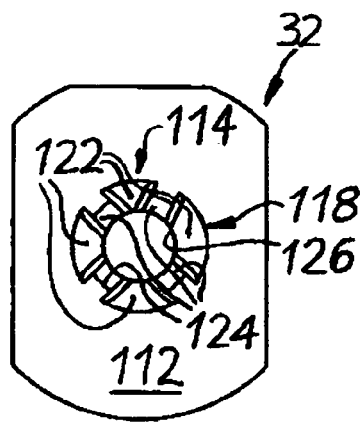
FIG. 7 shows a rear view of the insertion part of FIG. 4, seen from the right in FIG. 5.
Figure 8:
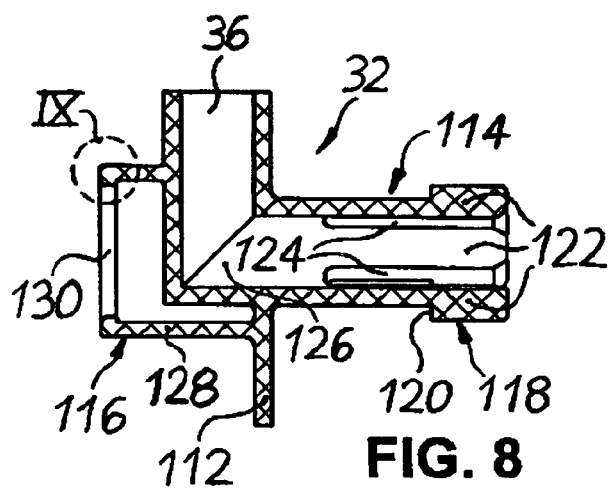
FIG. 8 shows a longitudinal sectional view of the insertion part of FIG. 4.

Further details regarding the insertion part 32, which is preferably injection-molded from a plastic such as polyamide 66 with glass fiber reinforcement, can be seen in FIGS. 4 to 9, the insertion part being formed with an essentially constant wall thickness in all its regions as can be seen in particular in FIG. 8, in order to avoid shape-related slack areas and thus insufficient dimensional stability as a result of accumulations of material.

Figure 5:
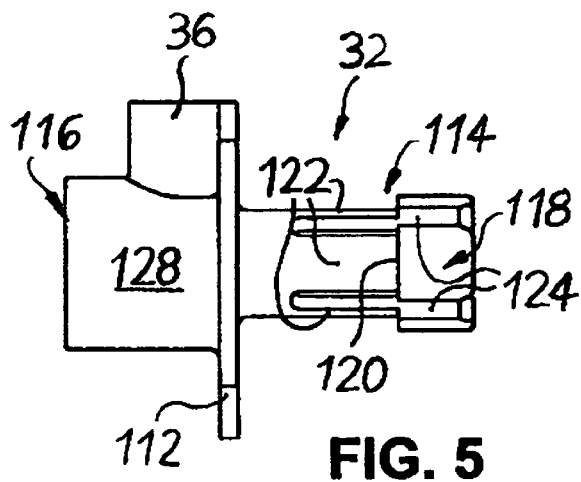
FIG. 5 shows a side view of the insertion part of FIG. 4.
Figure 6:
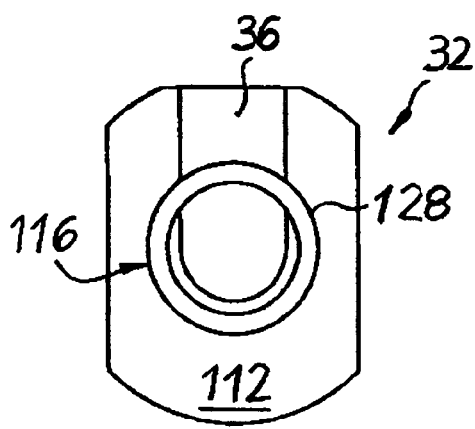
FIG. 6 shows a front view of the insertion part of FIG. 4, seen from the left in FIG. 5.

The insertion part 32 is formed on a flat baseplate 112 with plane-parallel end sides, of which the right-hand end side in FIG. 5, in the mounted state of the insertion part 32, bears flatly against the end side of the annular section 62 of the sleeve 56 which faces towards the pressure chamber 20. Arranged on the baseplate 112 are three functional sections of the insertion part 32, namely, on the side of the baseplate 112 which is remote from the pressure chamber 20, a fixing section 114 for fixing the insertion part 32 in the pressure connection 26, on the side of the baseplate 112 which faces towards the pressure chamber 20 a holding section 116 for releasably fixing the piston assembly 14 relative to the cylinder housing 12 and, likewise on the side of the baseplate 112 which faces towards the pressure chamber 20, the channel section 36 for deaerating the pressure chamber 20, which channel section has already been discussed above in the description of the figures.

In the illustrated example of embodiment, the insertion part 32 is mounted in the pressure connection 26 by means of a snap connection. To this end, the essentially hollow-cylindrical fixing section 114 is provided on its outer circumference, at its free end remote from the baseplate 112, with a segmented annular collar 118, of which the end side which faces towards the baseplate 112 forms an essentially annular, segmented abutment face 120. Starting from its free end, the fixing section 114 furthermore has a plurality of (in the illustrated example of embodiment four) slots 124 which extend in the longitudinal direction of the fixing section 114 in order to form resilient arms 122, the asymmetrical distribution of which over the circumference of the fixing section 114 (cf. FIG. 7) corresponds to the distribution of the longitudinal ribs 86 in the fourth bore section 70 of the stepped bore 54 in the basic body 38 of the cylinder housing 12 (cf. FIG. 3). Here, the slots 124 in the fixing section 114 of the insertion part 32 on the one hand and the longitudinal ribs 86 in the basic body 38 of the cylinder housing 12 on the other hand are adapted to one another in terms of their dimensions in such a way that, in the mounted state of the insertion part 32, the longitudinal ribs 86 engage with a small amount of circumferential play in the slots 124, but do not protrude radially inwards beyond the resilient arms 122. The asymmetrical circumferential distribution of the longitudinal ribs 86/slots 124 in a manner adapted to one another ensures in a simple manner a unique rotation angle orientation of the mounted insertion part 32 in the slave cylinder 10, namely in such a way that the channel section 36 on the insertion part 32 is oriented upwards in the vertical direction, as shown in FIG. 1. In the mounted state of the insertion part 32, the latter is also fixed in the slave cylinder 10 in a form-fitting manner in the axial direction, wherein the abutment face 120 on the annular collar 118 of the fixing section 114, as shown in FIG. 1, engages behind the annular end face 84 of the smaller-diameter sleeve section 60 of the sleeve 56 in the cylinder housing 12, in a snap-in hook-type manner, said annular end face 84 projecting radially inwards beyond the fourth bore section 70 of the stepped bore 54 in the basic body 38.

In order to produce, in a preferably automated manner, the afore-described snap connection between the cylinder housing 12 and the insertion part 32 which is oriented at an angle to the cylinder housing 12, said insertion part is pushed into the sleeve 56 starting from the open end of the cylinder housing 12 lined with the sleeve 56, until the resilient arms 122 of the fixing section 114 come to bear against a small sloping edge between the annular section 62 and the inner circumference of the smaller-diameter sleeve section 60 of the sleeve 56. Upon further axial relative displacement of the insertion part 32 relative to the cylinder housing 12, the resilient arms 122 bend radially inwards. As a result, the longitudinal ribs 86 in the fourth bore section 70 of the basic body 38 of the cylinder housing 12 enter the slots 124 of the fixing section 114 of the insertion part 32, before the resilient arms 122 spring radially outwards again and latch with their segmented abutment face 120 behind the annular end face 84 of the sleeve section 60. At more or less the same time, the baseplate 112 of the insertion part 32 comes to bear with its end side which faces towards the pressure connection 26 against the end face of the annular section 62 of the sleeve 56 which faces towards the pressure chamber 20. Since both the transition from the end face of the resilient arms 122 which faces the pressure connection 26 to the outer circumferential face of said resilient arms and also the transition of the end face of the longitudinal ribs 86 which faces the pressure chamber 20 to the inner circumferential face of said longitudinal ribs is designed to be right-angled, just with a broken edge, that is to say without a sloping face, the insertion part 32 can be joined to the cylinder housing 12 only if there is correct angular orientation between these parts. If an attempt is made to join an insertion part 32 which is not oriented at the correct angle to the cylinder housing 12, the facing end faces of the resilient arms 122 on the one hand and the longitudinal ribs 86 on the other hand abut against one another essentially over their entire surface, and thus prevent further axial displacement of the insertion part 32 relative to the cylinder housing 12. Since moreover the angular orientation of the insertion part 32 relative to the cylinder housing 12 takes place at the basic body 38 thereof, circumferential fixing of the sleeve 56 in the basic body 38 is not necessary.

As can furthermore be seen from FIGS. 1, 7 and 8, the inner circumference of the fixing section 114 delimits a cylindrical channel section 126 which is aligned with the central axis M of the slave cylinder 10 and passes through the baseplate 112 of the insertion part 32. On the side of the baseplate 112 which faces towards the pressure chamber 20, the channel sections 36 and 126 intersect, so that there is an essentially right-angled passage between the pressure chamber 20 and the pressure connection 26. As shown in FIG. 1, the vertically running channel section 36 ends just before the circumferential wall 24 of the cylinder housing 12 in the pressure chamber 20.

Any air inclusions or air bubbles in the pressure medium located in the pressure chamber 20 then gather at the top in the pressure chamber 20. Likewise, heated hydraulic fluid in the pressure chamber 20 rises to the top in the pressure chamber 20. When the piston 16 returns from an actuated position into its basic position shown in FIG. 1, a directional forced flow is produced through the channel sections 36 and 126 via the pressure connection 26 and the pressure line (not shown) to the clutch master cylinder (likewise not shown), which for its part is connected to a compensating reservoir (not shown) as mentioned above. As a result of the channel section 36 opening towards an area located at the top in the pressure chamber 20, the air inclusions or bubbles that have collected there, like the heated hydraulic fluid that has risen to that point, are entrained by the forced flow and thus carried away from the slave cylinder 10. Accordingly, the insertion part 32 ensures, with its vertically running channel section 36, continuous and reliable self-deaeration of the slave cylinder 10 and also dissipation of heated hydraulic fluid, and this makes additional deaeration connections or the like unnecessary.

Figure 9:
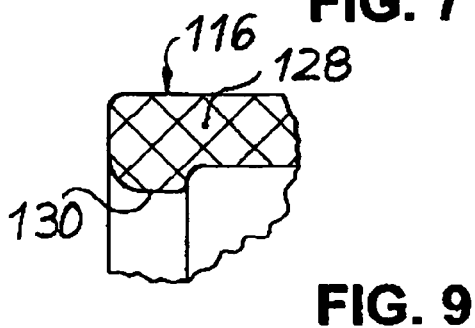
FIG. 9 shows an enlarged representation of detail IX in FIG. 8.

The holding section 116 of the insertion part 32 finally has a hollow cylinder 128 which is attached to the baseplate 112 and is axially aligned with the central axis M of the slave cylinder 10 in the mounted state of the insertion part 32 as shown in FIG. 1, said hollow cylinder being passed through from the side by the channel section 36 as shown in FIGS. 1 and 8. At its end facing towards the piston 16, the hollow cylinder 128 is provided on its inner circumference with a circumferential annular bead 130 which protrudes radially inwards, which annular bead is shown in an enlarged view in FIG. 9 and serves to temporarily hold the piston 16 and thus the piston assembly 14 in a form-fitting manner on the insertion part 32. To this end, the annular bead 130 co-operates with the extension 34 of the piston 16 on the pressure chamber side, or more specifically with an annular collar 132 (FIG. 1) which is integrally formed on the outer circumference at the end of the extension 34 remote from the piston 16, which annular collar 132 has an outer face which tapers slightly towards the pressure connection 26. The annular bead 130 on the holding section 116 of the insertion part 32 on the one hand, which annular bead as shown in FIG. 9 is rounded towards the pressure chamber 20, and the annular collar 132 on the extension 34 of the piston 16 on the other hand are adapted to one another in terms of their dimensions in such a way that the clear internal diameter of the annular bead 130 is slightly smaller than the greatest external diameter of the annular collar 132, whereas the distance thereof from the end face of the piston 16 is slightly greater than the axial length of the annular bead 130.

In order to hold the piston assembly 14 on the insertion part 32 during assembly of the slave cylinder 10, the piston assembly 14 is pushed into the cylinder housing 12 against the force of the helical compression spring 28 in the direction of reducing the size of the pressure chamber 20, until the extension 34 on the piston 16 comes to bear with its annular collar 132 (which is beveled towards the insertion part 32) against the rounded annular bead 130 which faces the pressure chamber 20. Upon further axial relative displacement of the piston assembly 14 relative to the cylinder housing 12 in the direction of the pressure connection 26, the annular collar 132 on the piston extension 34 expands the annular bead 130 of the holding section 116 radially outwards in an elastic manner. Once the annular bead 130 has been pushed over, said annular bead snaps behind the annular collar 132 as a result of the elastic properties of the material of the insertion part 32, that is to say snaps into the annular gap between the annular collar 132 and the end face of the piston 16 which faces towards the pressure chamber 20. The piston assembly 14 is now fixed in a form-fitting manner to the holding section 116 of the insertion part 32.

Since the piston assembly 14 is thus held in a position in which it is pushed as far as possible into the cylinder housing 12, the slave cylinder 10 only requires a small amount of space during storage, transport and mounting in the motor vehicle. Moreover, the slave cylinder 10 can be mounted in the motor vehicle essentially without any force, since the helical compression spring 28 does not have to be compressed but rather is held in a prestressed position by means of the holding of the piston assembly 14 by the insertion part 32. This also makes it possible for the slave cylinder 10 to be mounted in the motor vehicle as part of a hydraulic clutch actuation system, which is supplied to the production line of the motor vehicle manufacturer as a preassembled unit consisting of master cylinder, compensating reservoir, pressure line and slave cylinder 10, said unit being (partially) filled with hydraulic fluid, wherein the filling volume of the slave cylinder 10 in the held position of the piston assembly 14 corresponds almost to the rest volume of the ready-for-operation slave cylinder 10 in the basic position of the piston assembly 14 which is shown in FIG. 1.

For first actuation of the slave cylinder 10 mounted in the motor vehicle, the pressure medium is supplied to the pressure chamber 20 via the pressure connection 26. As a result of the pressure which then builds up in the pressure chamber 20, which pressure acts on the active face of the piston 16, the piston 16 is subjected to a force directed to the left in FIG. 1, which is added to the force of the helical compression spring 28. When the sum of these forces exceeds the retaining force of the connection between the extension 34 of the piston 16 and the holding section 116 of the insertion part 32, the annular bead 130 on the holding section 116 stretches back over the annular collar 132 on the extension 34, whereupon the piston assembly 14 is released from the insertion part 32. Further holding of the piston assembly 14 during operation of the slave cylinder 10 is not provided and moreover cannot take place since the distance shown in FIG. 1 between the extension 34 on the piston 16 and the holding section 116 on the insertion part 32 will never become any smaller during operation of the slave cylinder 10.

From the above description, it can be seen that the retaining force of the connection between the extension 34 of the piston 16 and the holding section 116 of the insertion part 32 is designed in such a way that on the one hand it is sufficiently greater than the spring force of the helical compression spring 28 so as to prevent undesirable release of the holding of the piston assembly 14, but on the other hand is sufficiently smaller than the retaining force of the connection between the insertion part 32 and the cylinder housing 12, so that the insertion part 32 is not pulled out of the pressure connection 26 upon first actuation of the slave cylinder 10.

Although the holding section 116 in the above-described example of embodiment is provided on its inner circumference with a closed contour in the circumferential direction in the form of the annular bead 130, which co-operates with the annular collar 132 on the extension 34 of the piston 16 in the manner described above, in order to hold the piston assembly 14 temporarily on the insertion part 32 in the manner of a snap connection, this form-fitting connection may also be configured differently, for example with resilient arms and snap-in hooks provided thereon as a holding section of the insertion part, in a manner analogous to the above-described fixing of the insertion part in the pressure connection.

In summary, there is disclosed a hydraulic cylinder, comprising a piston assembly with a piston and a piston rod, a cylinder housing with a housing bottom, a pressure chamber in the cylinder housing which is delimited by the piston and the housing bottom, a spring element which prestresses the piston assembly away from the housing bottom, and a fixing element which fixes the piston assembly in a predefined stroke position relative to the cylinder housing prior to first actuation of the hydraulic cylinder and is designed to release the piston assembly relative to the cylinder housing upon first actuation of the hydraulic cylinder. According to the invention, the spring element is arranged on the side of the piston which is remote from the pressure chamber, whereas the fixing element is provided in the pressure chamber at the housing bottom and co-operates with a mating element on the piston to releasably fix the piston assembly relative to the cylinder housing. As a result, a compact hydraulic cylinder is provided in which the fixing element which is provided for temporarily holding the piston assembly in particular does not make contact with the piston rod and also does not further impede operation of the hydraulic cylinder.

We claim:

1. Hydraulic cylinder, comprising a piston assembly which has a piston and a piston rod, a cylinder housing which has a housing bottom, a pressure chamber in the cylinder housing, which has one side delimited in a variable manner by the piston and another side which is delimited in a fixed manner by the housing bottom, a spring element which prestresses the piston assembly in a direction away from the housing bottom, and a fixing element which fixes the piston assembly in a predefined stroke position relative to the cylinder housing prior to first actuation of the hydraulic cylinder and is designed to release the piston assembly relative to the cylinder housing upon first actuation of the hydraulic cylinder; wherein the spring element is arranged on the side of the piston which is remote from the pressure chamber, whereas the fixing element is provided in the pressure chamber at the housing bottom and co-operates with a mating element on the piston to releasably fix the piston assembly relative to the cylinder housing.

2. Hydraulic cylinder according to claim 1, wherein the pressure chamber is arranged to be acted upon by a pressure means via a pressure connection provided at the housing bottom, in which pressure connection there is inserted an insertion part which forms the fixing element.

3. Hydraulic cylinder according to claim 2, wherein the insertion part has a holding section to which an extension on the pressure chamber side can be fixed in a form-fitting manner, said extension forming the mating element on the piston.

4. Hydraulic cylinder according to claim 3, wherein the holding section of the insertion part comprises a hollow cylinder which is aligned axially relative to a central axis of the pressure chamber and has an annular bead on its inner circumference, whereas the centric extension on the piston is provided with an annular collar on its outer circumference, which annular collar engages behind the annular bead in the condition where the piston is fixed to the insertion part.

5. Hydraulic cylinder according to claim 1, wherein the cylinder housing has a basic body made of plastic, which basic body is provided with a bore in which a metallic sleeve for the piston is inserted.

6. Hydraulic cylinder according to claim 5, wherein the sleeve comprises a larger-diameter sleeve section and a smaller-diameter sleeve section, which sections are joined to one another at the housing bottom of the cylinder housing via an annular section which together with a circumferential wall of the larger-diameter sleeve section delimits the pressure chamber, wherein the bore of the basic body is stepped, and wherein the sleeve is sealed relative to the basic body of the cylinder housing against the pressure in the pressure chamber by means of a static seal which is seated between the smaller-diameter sleeve section of the sleeve and a bore section of the stepped bore in the basic body which is associated therewith.

7. Hydraulic cylinder according to claim 6, wherein the sleeve is secured in the basic body of the cylinder housing by means of an annular securing element, which is passed through by the piston rod, which is connected to the piston at least in a manner resistant to tension and pressure, said securing element forming, on its side remote from the pressure chamber, an abutment for one end of the spring element, the other end of said spring element being supported against an annular collar on the piston rod.

8. Hydraulic cylinder according to claim 2, wherein the insertion part is anchored axially in the pressure connection in a form-fitting manner.

9. Hydraulic cylinder according to claim 8, wherein the insertion part is anchored in the pressure connection by means of a snap connection.

10. Hydraulic cylinder according to claim 9, wherein the insertion part has a side remote from the pressure chamber, on which side is a hollow cylindrical fixing section which has a free end and which is provided with an annular collar on its outer circumference and, starting from the free end of the hollow cylindrical fixing section, has multiple longitudinal slots so as to form a plurality of resilient arms, wherein the annular collar on the fixing section, in the mounted state of the insertion part, engages behind an annular end face in the pressure connection, said annular end face facing away from the pressure chamber.

11. Hydraulic cylinder according to claim 10, wherein the cylinder housing has a basic body made of plastic, which basic body is provided with a bore in which a metallic sleeve for the piston is inserted, and wherein the annular end face in the pressure connection which is engaged behind by the insertion part is formed by the sleeve of the cylinder housing.

12. Hydraulic cylinder according to claim 2, wherein the insertion part has a channel section which communicates with the pressure connection and, in the installed position of the hydraulic cylinder, extends in the vertical direction and opens into the pressure chamber in the vicinity of a circumferential wall of the cylinder housing.

13. Hydraulic cylinder according to claim 12, wherein the channel section of the insertion part is hydraulically connected to a hollow-cylindrical fixing section which is plugged into the pressure connection at the housing bottom of the cylinder housing.

14. Hydraulic cylinder according to claim 12, wherein the insertion part is anchored in the pressure connection at an oriented angle of rotation relative to the cylinder housing and in a form-fitting manner in the circumferential direction.

15. Hydraulic cylinder according to claim 14, wherein the channel section of the insertion part is hydraulically connected to a hollow-cylindrical fixing section which is plugged into the pressure connection at the housing bottom of the cylinder housing; and wherein the hollow-cylindrical fixing section of the insertion part is provided with at least two longitudinal slots which are distributed asymmetrically over the circumference of the fixing section, whereas the pressure connection is provided with at least two longitudinal ribs on its inner circumference, the distribution of said longitudinal ribs over the circumference of the pressure connection corresponding to the distribution of the longitudinal slots in the insertion part, wherein, in the mounted state of the insertion part, the longitudinal ribs on the pressure connection engage in the longitudinal slots in the insertion part in such a way as to orient the angle of rotation.

16. Hydraulic cylinder according to claim 2, wherein the insertion part is injection-molded from a plastic.

17. Hydraulic cylinder according to claim 1 and being a slave cylinder for a hydraulic clutch actuation system for motor vehicles.

\* \* \* \* \*